United States Patent [19]

Herr et al.

[11] 4,171,684
[45] Oct. 23, 1979

[54] STALL DESIGN OF FEEDING STATION

[75] Inventors: Warren E. Herr, Hasbrouck Heights, N.J.; Richard W. Hunt, Bethlehem, Conn.

[73] Assignee: The De Laval Separator Company, Poughkeepsie, N.Y.

[21] Appl. No.: 779,039

[22] Filed: Mar. 18, 1977

[51] Int. Cl.² .................................................. A01K 5/00
[52] U.S. Cl. ..................................... 119/27; 119/51 R
[58] Field of Search .................... 119/27, 20, 16, 51 R, 119/56, 61

[56] References Cited

U.S. PATENT DOCUMENTS

| | | | |
|---|---|---|---|
| 716,952 | 12/1902 | Snow | 119/27 |
| 1,009,714 | 11/1911 | Batchelder | 119/27 |
| 1,589,226 | 6/1926 | Regan et al. | 119/27 |
| 3,131,673 | 5/1964 | Rudd | 119/56 |
| 3,850,145 | 11/1974 | Yoder et al. | 119/51 R |
| 3,858,555 | 1/1975 | Smith | 119/27 |

Primary Examiner—Hugh R. Chamblee
Attorney, Agent, or Firm—Cyrus S. Hapgood

[57] ABSTRACT

An animal feeding station having an improved design to facilitate feeding of the animal. In particular, a manger that has a bottom portion approximating a hemispherical shape, side wall portions extending upward from the bottom portion as a conical tangent of the hemisphere, a front wall portion which extends vertically upward and is tangential to the aforesaid hemispherical portion and a rearwardly, upwardly sloped flat surface portion which generally conforms to the position of the animal's lower jaw when ingesting its food. Further, a shroud is provided over the manger which has a top wall sloped and disposed in a manner which restricts the vertical movement of the animal's head until the animal moves rearwardly.

Another feature of the stall is the provision of slidably removable side panels, which permit the animal to eat in relative isolation and without the eye distraction caused by being able to see animals outside the stall.

Further, a bar shaped in the form of an arch extends over the rear portion of the animal so as to preclude mounting of the feeding animal by stable mates.

For use with electronic automatic feed control systems, there is provided a front panel through which the animal extends it head, which houses an encapsulated antenna having a metal reflector.

9 Claims, 8 Drawing Figures

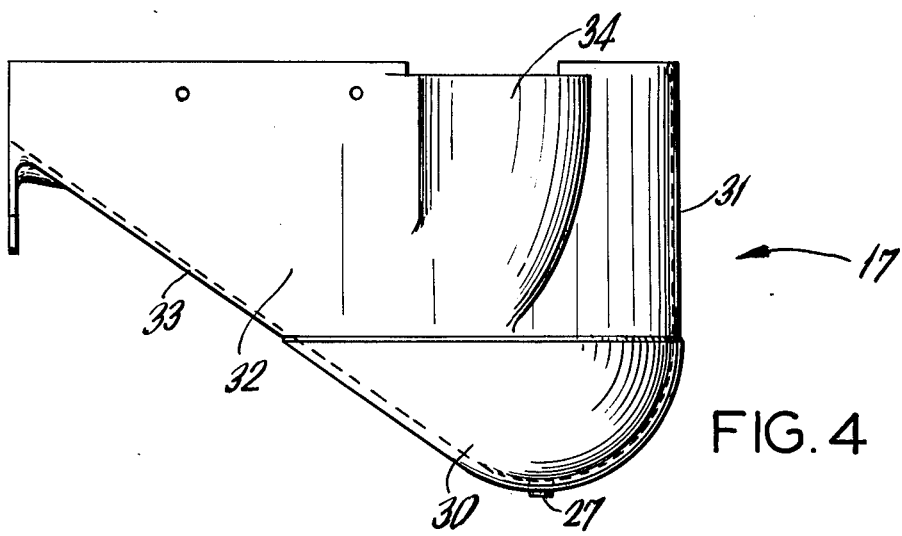
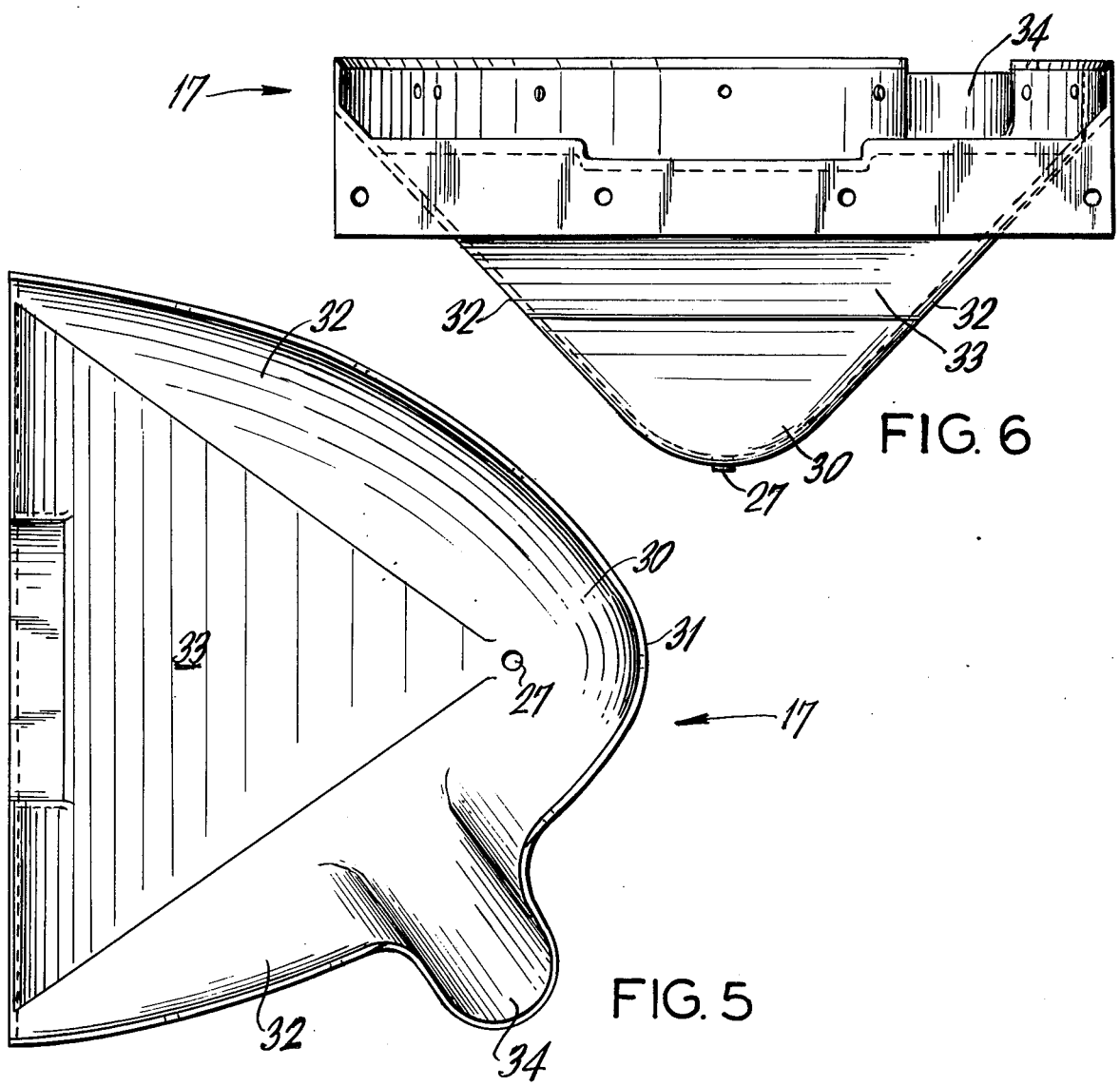

STALL DESIGN OF FEEDING STATION

BACKGROUND OF THE INVENTION

The development of automatic feeding stations, such as described in U.S. Pat. No. 3,541,995 has substantially improved the efficiency of feeding cattle. However, it was felt that the shape of the manger and the manner of introducing feed into the manger worked against the animal ingesting its food at the best rate.

It was further realized that visual and or physical contact between the feeding animal and its stable mates adversely affected feeding efficiency.

Further, it became appreciated that the feeding rate of the animal could be enhanced by reducing the animal's ability to elevate its head.

Finally, with respect to the feeding system described in U.S. Pat. No. 3,541,995, the transmitter of the interrogator described therein did not possess the desired transmission characteristics. Moreover, it was subject to activation by nearby transponders, i.e. transponders other than that attached to the feeding animal.

THE INVENTION

Generally, the subject invention concerns itself with improvements in animal feeding station design. In particular, the invention provides a novel manger bowl design wherein the shape of the lower portion whereat the feed is located, is such that it is substantially hemispherical and only slightly larger than the muzzle of the animal it is intended to feed. Further, the manger has a conduit disposed on its side and slightly rearwardly of the lower portion. Other design features of the bowl include a rearward, upwardly sloped flat surface shaped and positioned to conform with the normal eating position of the lower jaw of the animal and a shroud disposed atop the manger that limits the ability of the animal to raise its head.

The advantages of the manger bowl design are several. By having the feed flow into a substantially hemispherically shaped bowl, the feed is constantly under the nose and mouth of the animal, thus, keeping head and tongue movement to a minimum; the bowl shape also eliminating the need for "chasing" the feed around the manger. Further, by introducing the feed into the bowl at an opening to the side and toward the rear of the animal's lower jaw, dusting, which causes discomfort or sneezing, is considerably reduced with the concomitant advantage of increasing the feeding rate.

Positioning a shroud over the manger having a top surface which precludes the animal from lifting its head without substantial rearward movement, assits in the exchange of animals in the feeding stall and further prevents eye contact outside the stall when the animal is in feeding position. When feeding at the station or stall ceases, the animal will raise its head and be forced backward, thus partially extending the rear of its body beyond the protective means described hereafter.

The manger bowl and shroud design afford the further advantage of appreciably reducing grain waste.

The manger has a lower feed cavity with all walls extending therefrom sloping toward said cavity, thus assuring the return of grain to the feed cavity. Moreover, the shroud forms a closure that prevents the feed, through animal head-tossing, from leaving the manger.

Apart from the manger, the stall is designed to permit only one animal at a time to feed. The stall is adjustable in length and width for the breed being fed. It may also be permanently fixed in these dimensions for breeds having a generally uniform size.

The sides of the stall at the position adjacent the rearward flanks of the animal has slidably removable panels. The panels may be readily retracted for cleaning the rear of the stall.

The side panels of the stall adjacent the forward part of the animal may be permanently affixed to the body of the stall, or retractable, as in the case of the rearward panels.

The side panels are solid and opaque to prevent the feeding animal from having eye contact with its stable mates, particularly eye contact with the "boss" animal; thereby avoiding distracting the feeding animal through fear of the presence of the "boss" animal.

There is provided an opening in the side panels to permit the animal eye contact outside the stall. This available eye contact assists in causing the animal to move away from the stall.

Over the top portion of the stall there is mounted an arch member, which prevents a stable mate from mounting the feeding animal.

For use with automatic feeding systems such as described in U.S. Pat. No. 3,541,995, the front panel of the stall, the portion through which the animal extends its head when in the feed stall, houses an encapsulated or potted antenna with a metal reflector which transmitter focuses the signal from the interrogator, thereby improving the transponder's ability to receive said signal; shields the antenna from signals from transponders located outside the stall area and prevents receipt of false signals from conducting bodies in the vicinity of the antenna.

Hereafter the invention will be described by reference to the drawings.

FIG. 4 is a side elevational view of the manger of this invention,

FIG. 5 is a plan view of the manger of this invention,

FIG. 6 is a rear view of the manger of this invention,

Figure 1:
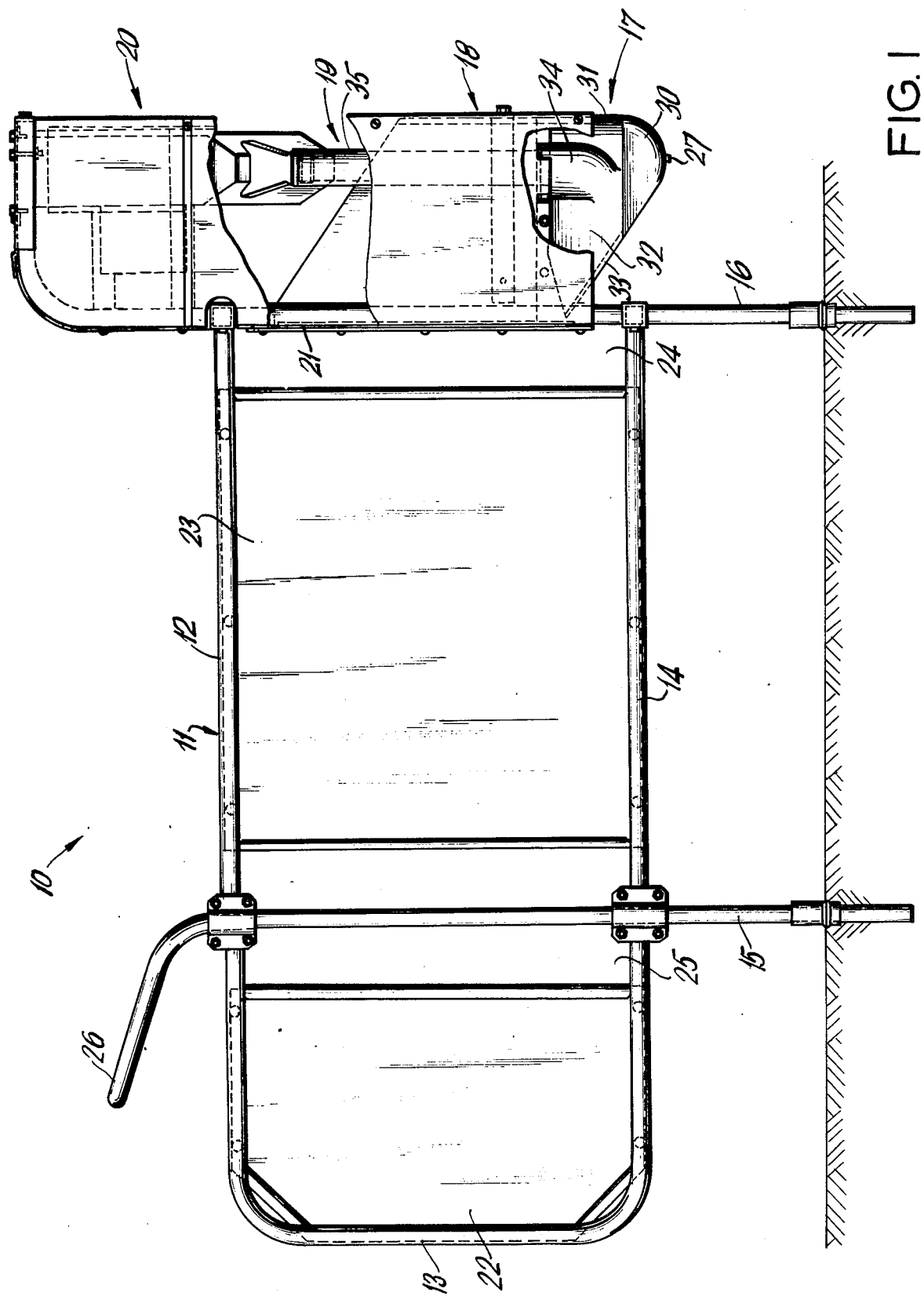
FIG. 1 is a side elevational view of the stall of this invention.

Referring to FIG. 1, the stall, generally designated as 10, has U-shaped side-panel rails 11, having a top bar portion 12, an end bar portion 13 and a bottom bar portion 14. Rail 11, is mounted toward its rear portion to the stanchion 15 and at its forward end to the stanchion 16, which stanchion 16 is a mounting base for the manger, generally designated as 17, the shroud, generally at 18, the feed input conduit, generally designated as 19, said conduit joining the feed source to the manger, and the feed filling mechanism, generally designated as 20. Also, the front panel 21, better shown in FIG. 2, is mounted to the stanchion 16.

The side rails 11 have rearward panels 22, which preferably are slidably removable, mounted on each of rails 11 and forward panels 23, which are also preferably slidable, mounted on rails 11. The panels 22 and 23 are disposed such that there are forward and rearward openings, 24 and 25, respectively, through which the animal may see as it retreats from the stall 10. The panels 22 and 23 are constructed of solid, opaque material.

Figure 2:
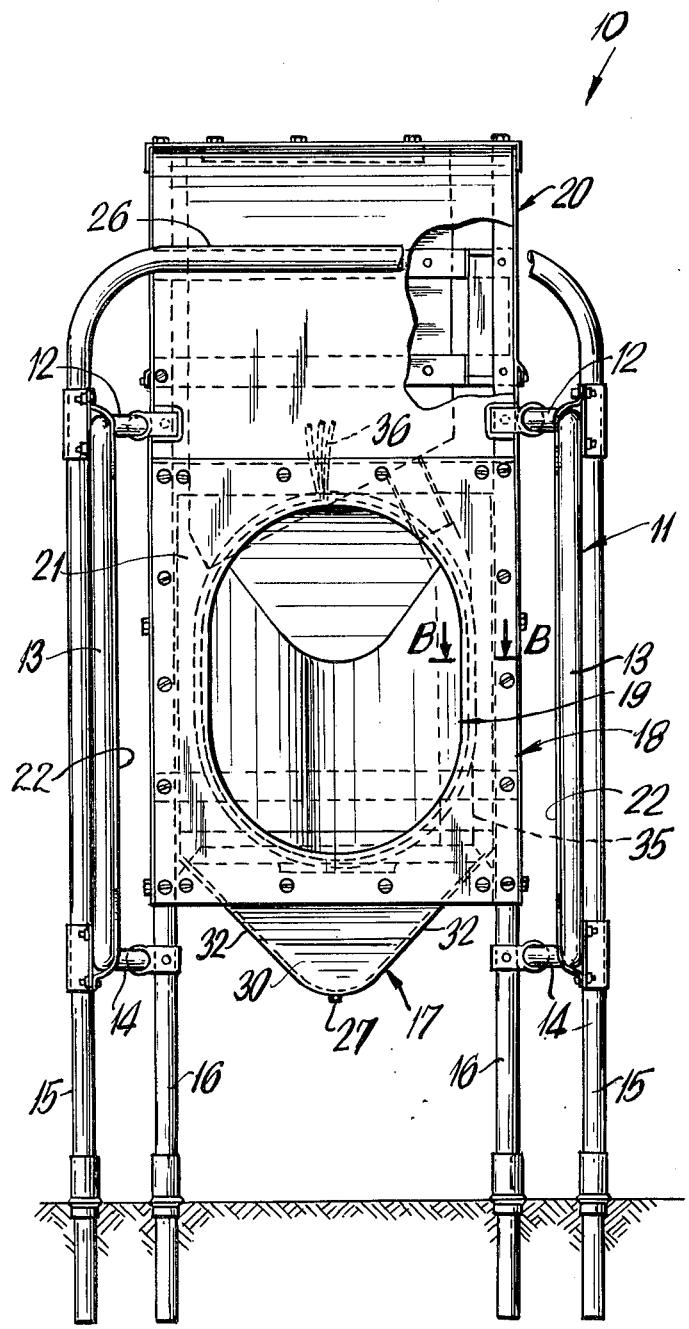
FIG. 2 is an elevational view from the entering end of the stall of this invention.
Figure 3:
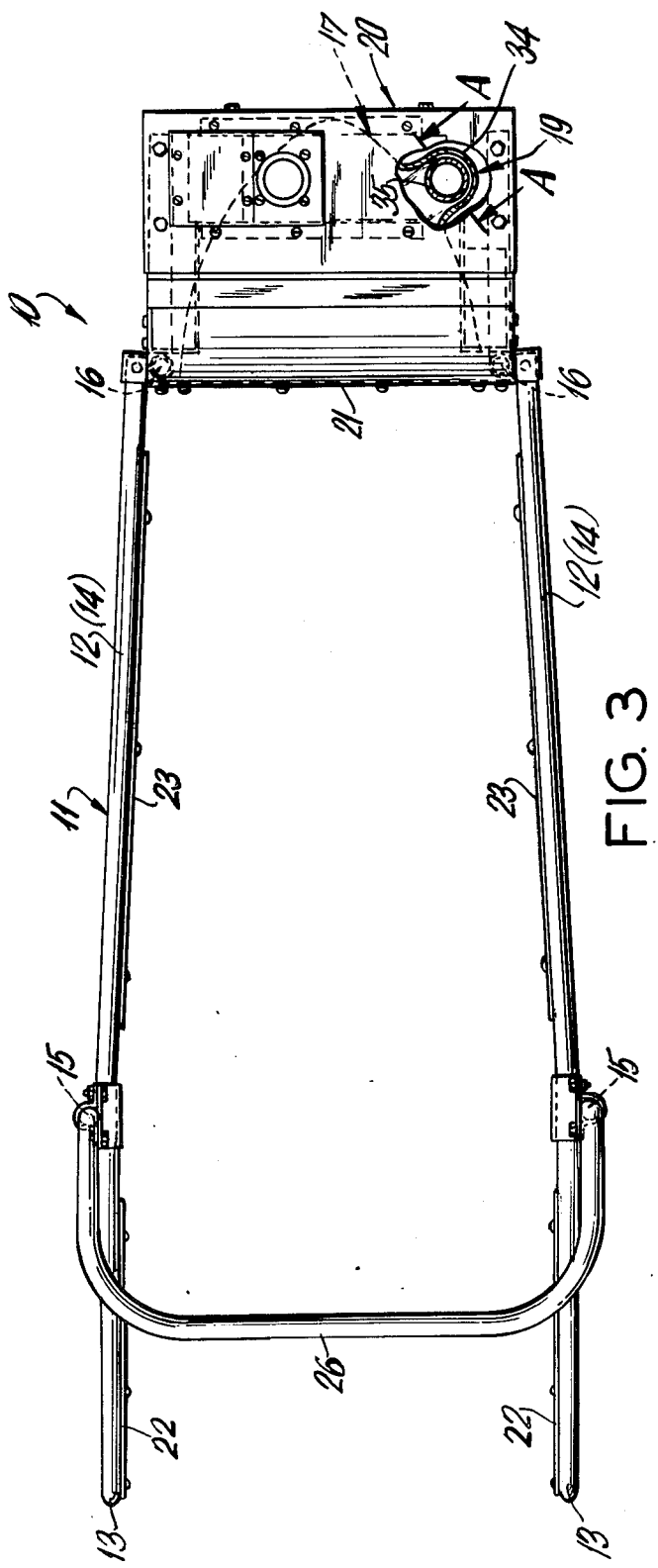
FIG. 3 is a plan or top view of the stall of this invention.

As shown in FIGS. 2 and 3, the stanchion 15 has an upper arched portion 26 which functions as an antimounting device and prevents stable mates of the feeding animal from mounting the animal.

The novel manger design of this invention is shown in greater detail in FIGS. 4-6.

Referring to FIG. 4, there is a substantially hemispherical bottom portion 30, which is dimensioned such that it is slightly larger than the muzzle of the animal being fed. The front wall portion 31 is vertical and tangent to the hemispherical portion 30. Side wall portion 32, best shown in FIG. 6, extends upward at a conical tangent to the hemisphere portion 30. The manger bowl is completed by a rearwardly extending, upwardly shaped flat surface portion 33 which conforms to the position of the animal's lower jaw during ingestion.

Shown best in FIG. 5, is the feed entry port 34, which is disposed to the side and toward the rear of the animal's jaw. The contour of the port 34 is faired in a manner as to permit all types of feed to easily flow, without blockage, to the bottom of portion 30.

Figure 7:
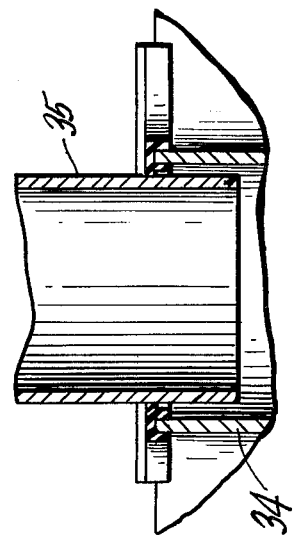
FIG. 7 is a cross-section along the line A—A of FIG. 3.

In FIG. 7, there is shown an enlargement of the interconnection between the feed conduit 35 and the feed entry port 34.

Figure 8:
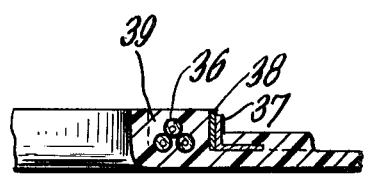
FIG. 8 is a cross-section along the line B—B of FIG. 2.

Referring to FIG. 8, an enlargement of the antenna is shown having conductors 36, L-shaped support plate 37, and the metal reflector 38, all of which components are encapsulated or potted in a suitable dielectric material 39.

A further feature of the stall design is arranging the horizontal portion of the forward stanchion 16 in a plane that is not in the plane of the antenna. As shown in FIG. 3, the horizontal portion of the stanchion 16 is disposed outwardly from the plane of the antenna.

In summation, the stall design of the subject invention affords an animal feeding station having an increased rate of use over prior systems, thus permitting the installation of fewer stations per unit number of animals, and thereby reducing the overall cost in using an automatic feeding system.

When used as a feed station in conjunction with a milking station for dairy cows, the nutrient intake rate is increased while the cow is residing in the milking station; thereby resulting in greater total intake of nutrients and/or decreased time in milking station.

What is claimed is:

1. In an automatic feeding station having an interrogator for receiving and responding to a transponder disposed on the animal feeding in the stall, said stall having a front panel through which the animal extends its head and a manger disposed outboard of said front panel, the improvement which comprises housing an antenna having a metal reflector in the front panel and encapsulating said antenna in a suitable dielectric so as to amplify the range of the transmitting component of the interrogator and concomitantly shield the antenna from conducting signals of transponders located outside the stall to the interrogator.

2. In an animal feeding station having a stall with side rails supported by stanchion members, a front panel at one end of the stall through which the feeding animal extends its head, and a manger outboard of the front panel, the improvement comprising a manger having a bottom portion substantially hemispherical in shape, which bottom portion forms a cavity for receiving and containing the feed, said manger further including a conduit for introducing the feed to the bottom portion, which conduit is disposed outwardly and rearwardly of the bottom portion, whereby the introduction of feed into the manger is at a place to the side of and toward the rear of the animal's jaw when the animal is in feeding position, and an interrogator for receiving and responding to a transponder disposed on the animal feeding in the stall, an antenna having a metal reflector housed in said front panel, said antenna being encapsulated in a dielectric so as to amplify the range of the transmitting component of the interrogator and concomitantly shield the antenna from conducting signals of transponders located outside the stall to the interrogator.

3. In an animal feeding station, the combination of a stall and a manger at one end of the stall, said manger having a bottom portion substantially hemispherical in shape and only slightly larger than the muzzle of the animal for which the feeding station is designed, said bottom portion forming a cavity for receiving and containing the feed, and means disposed laterally and rearwardly of said bottom portion for introducing the feed thereto at a place to the side of and toward the rear of the animal's jaw, but under the jaw, when the animal is in feeding position.

4. The combination of claim 3, comprising also a shroud disposed above the manger and having a surface sloping downward and forward from a region overlying the rear of the manger, said sloping surface being positioned to limit the vertical head movement of the feeding animal so that the animal, on raising its head, will be forced rearward from feeding position.

5. The combination of claim 3, in which the stall has opposite side members supported by vertical members, the combination comprising also a bar rigidly secured to the stall at the rear portion thereof and spanning opposite side members, said bar being arched upwardly and positioned to preclude a stable mate outside the stall from mounting the animal feeding at the manger.

6. The combination of claim 3, in which the stall has opposite side members and a pair of front vertical members, the combination comprising also solid, opaque forward and rear panels on each of the opposite side members, there being limited spacing between the forward edges of the forward panels and said front vertical members, respectively, and there being limited spacing between the forward and rear panels on each of the opposite side members, so as to enable the animal in the stall to have eye contact with the area outside the stall as the animal moves rearwardly away from the manger.

7. The combination of claim 3, in which the manger also has a rear flat portion sloping upwardly from said bottom portion and with opposite side edges which converge toward said bottom portion, said flat portion being disposed at a level and angle to accommodate the normal position of the lower jaw of the feeding animal, the location of said feed introducing place allowing feed to flow to said bottom portion unobstructed by the feeding animal.

8. The combination of claim 7, comprising also a shroud disposed above the manger and having a surface sloping downward and forward from a region overlying the rear of the manger, said sloping surface being positioned to limit the vertical head movement of the feeding animal so that the animal, on raising its head, will be forced rearward from feeding position.

9. In an animal feeding station, the combination of a stall having opposite side members and a pair of front vertical members, a manger outboard of the front vertical members, solid opaque forward and rear panels on each of the opposite side members, there being limited spacing between the forward edges of the forward panels and said front vertical members, respectively, and there being limited spacing between the forward and rear panels on each of the opposite side members, so as to enable the animal in the stall to have eye contact with the area outside the stall as the animal moves rearwardly away from the manger, a shroud disposed above the manger and having a surface sloping downward and forward from a region overlying the rear of the manger, said sloping surfce being positioned to limit the vertical head movement of the feeding animal so that the animal, on raising its head, will be forced rearward from feeding position, the manger having a bottom portion substantially hemispherical in shape and only slightly larger than the muzzle of the animal for which the feeding station is designed, said bottom portion forming a cavity for receiving and containing the feed, and means disposed laterally and rearwardly of said bottom portion for introducing the feed thereto at a place to the side of and toward the rear of the animal's jaw, but under the jaw, when the animal is in feeding position.

* * * * *